(12) United States Patent  
Mastrandrea (10) Patent No.: US 10,723,230 B2  
(45) Date of Patent: Jul. 28, 2020

(54) INTELLIGENT VEHICLE CHARGING

(71) Applicant: Thunder Power New Energy Vehicle Development Company Limited, Central (HK)

(72) Inventor: Francesco Mastrandrea, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/675,541

(22) Filed: Aug. 11, 2017

(65) Prior Publication Data

US 2018/0065494 A1 Mar. 8, 2018

Related U.S. Application Data

(60) Provisional application No. 62/384,298, filed on Sep. 7, 2016.

(51) Int. Cl.
*B60L 3/12* (2006.01)
*B60L 11/18* (2006.01)
(Continued)

(52) U.S. Cl.
CPC .......... *B60L 11/1816* (2013.01); *B60L 53/14* (2019.02); *B60L 53/30* (2019.02); *B60L 53/50* (2019.02);
(Continued)

(58) Field of Classification Search
None
See application file for complete search history.

(56) References Cited

U.S. PATENT DOCUMENTS 8,965,669 B2\* 2/2015 Fisher ................. B60L 53/68  
  701/117  
9,026,347 B2\* 5/2015 Gadh .................. B60L 11/1824  
  701/123

(Continued)

FOREIGN PATENT DOCUMENTS

DE 102013014527 A1 3/2015  
EP 2894436 A1 7/2015  
WO 2013/053413 A1 4/2013

OTHER PUBLICATIONS

European Search Report for EP 17189800 dated Jan. 18, 2018, 7 pages.

*Primary Examiner* — Jonathan M Dager  
(74) *Attorney, Agent, or Firm* — Kilpatrick Townsend & Stockton, LLP (57) ABSTRACT

Embodiments can provide a system to facilitate a network of electric vehicle (EV) charging stations. Information regarding individual EV stations can be gathered and stored in one or more databases. Such information may be used to facilitate routing and/or scheduling of individual EV charging to the EV charging stations. A request may be received over a network to charge an EV. In response to receiving the request, one or more charging stations in the network may be determined as being available for charging the EV. Information regarding the one or more charging stations may be "pushed" to the EV and/or a client computing device associated with the EV for selection. A selection of a particular EV charging station can be received and the selected EV charging station can be accordingly reserved for charging the EV.

16 Claims, 5 Drawing Sheets

(51) Int. Cl.
*G06Q 30/06* (2012.01)
*B60L 53/14* (2019.01)
*B60L 53/60* (2019.01)
*B60L 53/50* (2019.01)
*B60L 53/63* (2019.01)
*B60L 53/65* (2019.01)
*B60L 53/30* (2019.01)
*G06Q 10/02* (2012.01)
*G07C 5/00* (2006.01)
*H04W 64/00* (2009.01)

(52) U.S. Cl.
CPC ............... *B60L 53/60* (2019.02); *B60L 53/63* (2019.02); *B60L 53/65* (2019.02); *G06Q 10/02* (2013.01); *G06Q 30/0639* (2013.01); *G07C 5/008* (2013.01); *H04W 64/00* (2013.01); *B60L 2240/62* (2013.01); *B60L 2240/66* (2013.01); *B60L 2240/68* (2013.01); *B60L 2240/72* (2013.01); *B60L 2260/52* (2013.01); *B60L 2260/54* (2013.01); *B60L 2260/58* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 9,112,382 | B2* | 8/2015 | Paul | G06Q 50/06 |
| 9,143,008 | B2* | 9/2015 | Aisu | H02J 13/0086 |
| 9,610,853 | B1* | 4/2017 | Miller | G01C 21/3679 |
| 9,714,837 | B2* | 7/2017 | North | G01C 21/367 |
| 2009/0091291 | A1* | 4/2009 | Woody | B60W 20/13 |
| | | | | 320/109 |
| 2009/0312903 | A1* | 12/2009 | Hafner | B60L 53/665 |
| | | | | 701/36 |
| 2011/0191220 | A1* | 8/2011 | Kidston | H02J 7/02 |
| | | | | 705/34 |
| 2011/0276194 | A1* | 11/2011 | Emalfarb | B60L 53/60 |
| | | | | 700/297 |
| 2011/0288765 | A1* | 11/2011 | Conway | G01C 21/3469 |
| | | | | 701/533 |
| 2012/0150359 | A1* | 6/2012 | Westergaard | G06Q 50/06 |
| | | | | 700/291 |
| 2012/0166012 | A1* | 6/2012 | Lee | B60L 53/65 |
| | | | | 700/297 |
| 2012/0179323 | A1* | 7/2012 | Profitt-Brown | G01C 21/3682 |
| | | | | 701/29.1 |
| 2012/0203726 | A1* | 8/2012 | Klabjan | B60L 53/63 |
| | | | | 706/46 |
| 2012/0296678 | A1* | 11/2012 | Boot | G06Q 10/02 |
| | | | | 705/5 |
| 2012/0306446 | A1* | 12/2012 | Suganuma | B60L 58/15 |
| | | | | 320/109 |
| 2013/0041850 | A1* | 2/2013 | LaFrance | B60L 53/60 |
| | | | | 705/412 |
| 2013/0138542 | A1* | 5/2013 | Sirton | G06Q 10/0631 |
| | | | | 705/34 |
| 2013/0179007 | A1* | 7/2013 | Dalum | B60W 10/26 |
| | | | | 701/2 |
| 2013/0226441 | A1* | 8/2013 | Horita | B60Q 9/00 |
| | | | | 701/118 |
| 2013/0339072 | A1* | 12/2013 | Touge | G06Q 10/00 |
| | | | | 705/5 |
| 2013/0346902 | A1* | 12/2013 | Epstein | B60L 53/30 |
| | | | | 715/771 |
| 2014/0046499 | A1* | 2/2014 | Raskar | B60L 53/68 |
| | | | | 700/297 |
| 2014/0142770 | A1* | 5/2014 | Sellschopp | B60L 53/60 |
| | | | | 700/291 |
| 2014/0266004 | A1* | 9/2014 | Andrews, Jr. | B60L 53/12 |
| | | | | 320/104 |
| 2014/0354228 | A1* | 12/2014 | Williams | B60L 11/1844 |
| | | | | 320/109 |
| 2014/0371969 | A1* | 12/2014 | Asai | B60L 53/14 |
| | | | | 701/22 |
| 2015/0045985 | A1* | 2/2015 | Yenamandra | G01C 21/3679 |
| | | | | 701/1 |
| 2015/0328999 | A1* | 11/2015 | Dureau | H02J 7/0027 |
| | | | | 320/109 |
| 2016/0052413 | A1* | 2/2016 | Shimizu | H02J 3/00 |
| | | | | 700/291 |
| 2016/0068121 | A1* | 3/2016 | Maini | B60R 16/03 |
| | | | | 307/10.1 |
| 2016/0075247 | A1* | 3/2016 | Uyeki | H02J 7/0063 |
| | | | | 455/456.3 |
| 2016/0091338 | A1* | 3/2016 | Abuelsaad | G01C 21/3697 |
| | | | | 701/538 |
| 2016/0176307 | A1* | 6/2016 | Becker | B60L 53/60 |
| | | | | 320/109 |
| 2016/0193932 | A1* | 7/2016 | Vaghefinazari | B60L 53/67 |
| | | | | 320/109 |
| 2016/0232736 | A1* | 8/2016 | Holtappels | G07F 11/44 |
| 2017/0372244 | A1* | 12/2017 | Westergaard | G06Q 50/06 |
| 2018/0034271 | A1* | 2/2018 | Lam | B60L 53/64 |

\* cited by examiner

INTELLIGENT VEHICLE CHARGING

CROSS-REFERENCE TO RELATED APPLICATION

The present application is a nonprovisional of and claims priority to U.S. Provisional Application No. 62/384,298, filed Sep. 7, 2016, the entire contents of which are hereby incorporated by reference for all purposes.

BACKGROUND OF THE INVENTION

This invention relates generally to vehicle charging.

An electric vehicle charging station, also called EV charging station, electric recharging point, charging point, or charge point and EVSE (electric vehicle supply equipment), is an element in an infrastructure that supplies electric energy for the recharging of electric vehicles, such as plug-in electric vehicles, including electric cars, neighborhood electric vehicles and plug-in hybrids. As electric vehicles and battery electric vehicle ownership is expanding, there is a growing need for widely distributed publicly accessible charging stations, some of which support faster charging at higher voltages and currents than are available from residential EVSEs. Many charging stations are on-street facilities provided by electric utility companies or located at retail shopping centers and operated by many private companies. These charging stations provide one or a range of heavy duty or special connectors that conform to the variety of electric charging connector standards.

With the growth of electric vehicle ownerships, the present infrastructure of EV charging stations would soon be unable to support charging EVs. Some electric utilities have reported numbers that indicate that even a single 220V charger within the circuit served by a transformer may, during peak consumption hours, overload and burn out the transformer. Therefore, the existing infrastructure needs to be upgraded both from a capacity standpoint as well as from a flexibility and power routing and control standpoint. While it is foreseeable that the infrastructure of EV charging would expand as to the number of power lines and the number of EV charging stations, there is also a need to improve charging of the individual EVs. For example, unlike the traditional gas stations, EV charging stations may not be expanded in areas due to constraints of a local power grid. Gas can be ported by a truck to wherever the gas station may be and stored, electricity may not be transmitted to EV stations above the capacity of the power grid. Therefore, there is a need to improve routing and scheduling of charging of the individual EVs through the EV charging stations.

BRIEF SUMMARY OF THE INVENTION

In one aspect, embodiments can provide a system to facilitate a network of EV charging stations. Information regarding individual EV stations can be gathered and stored in one or more databases. Such information may include the location, current charging capacity, the overall capacity of the power grid the EV charging stations are on, type of vehicle supported by the EV stations and/or any other aspects regarding the individual EVs. Such information regarding the individual EVs may be acquired from the individual EVs over a communication network, such as the Internet, periodically. Such information may be used to facilitate routing and/or scheduling of individual EV charging to the EV charging stations.

In some embodiments, a request may be received over a network, for example a wireless network, from a EV for charging by a server that is operatively connected to the aforementioned databases. The received request may include information indicating a current location of the requesting EV, a current battery level of the EV, one or more charging requirements for the requesting EV, a current speed of the EV, a destination the requesting EV is traveling to, and/or any other aspects about the requesting EV. In these embodiments, the server may be configured to determine one or more charging stations that are available for the requesting EV based on the EV charging station information described herein. This determination may involve determining a path the requesting EV can travel towards the destination using the battery power left in the requesting EV, locations of EV charging stations on this path, one or more of those EV charging stations that have capacities to charge the requesting EV, the overall capacity of the power grid of those EV charging stations, and/or any other aspects. Based on this determination, the server can send locations of the one or more charging stations and information regarding those charging stations to the requesting EV.

In some embodiments, a system is provided on an EV to facilitate intelligent charging of the EV through a EV charging station network described above and herein. The system can be configured to determine if the EV needs to charge the battery based on the current battery level and the destination information of the EV. When the system determines the EV needs to charge the battery, the system can be configured to generate a request to the server as described above and herein. After the system receives the locations of the one or more EV charging stations that can charge the EV, the system can present such information to the user(s) of the EV for selection. Once a charging EV is selected, the system can send the selection to the server and the server can be configured to schedule the charging station for charging the EV. A reservation may be sent to the selected EV, by the server and/or the EV, indicating a time window in which the requesting EV will arrive for charging. The selected EV charging station can reserve the time window for the EV once the reservation is received.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION OF THE INVENTION

Figure 1:
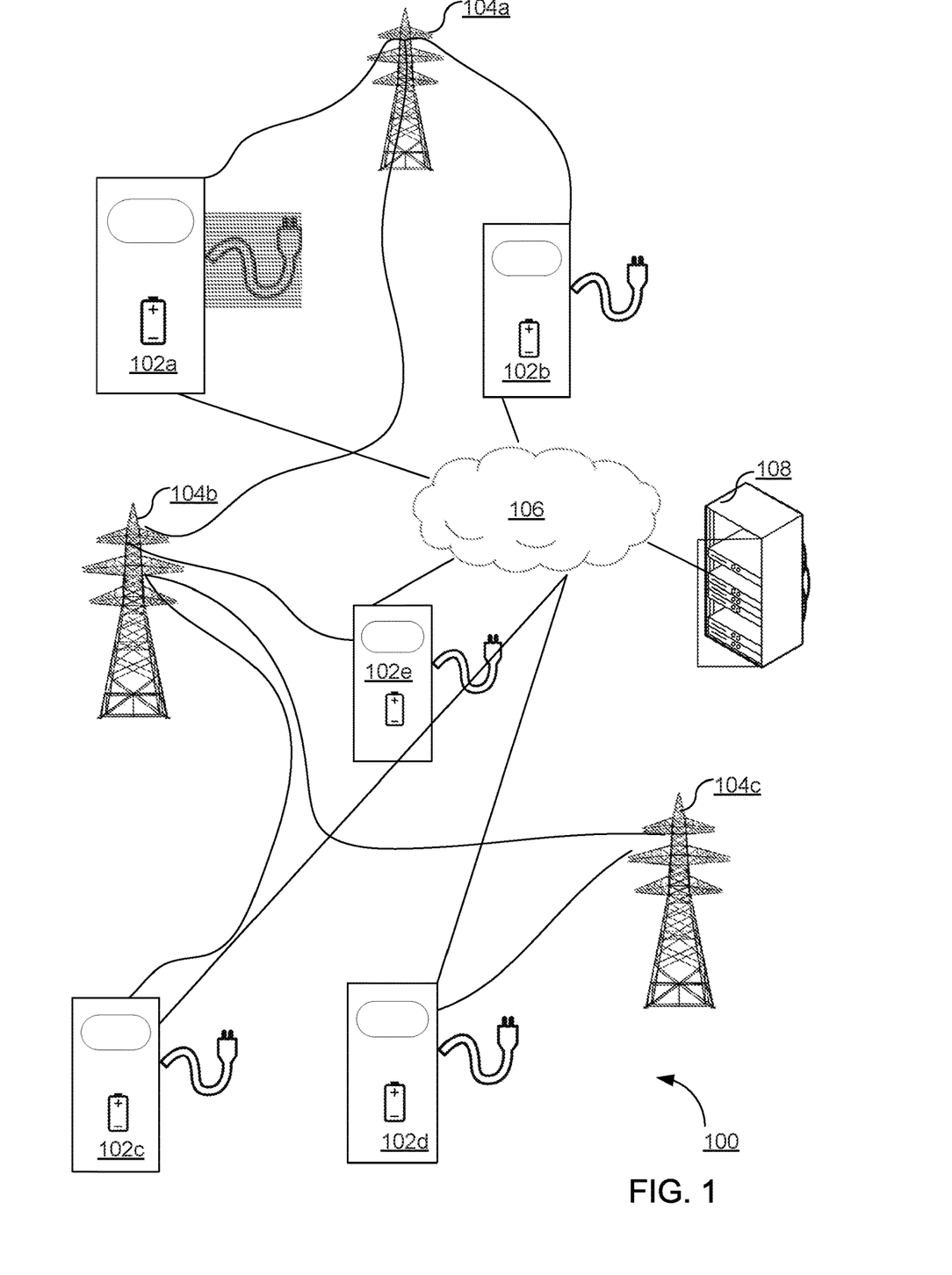
FIG. 1 generally illustrates an example of an EV charging station network 100 in accordance with the disclosure.

Embodiments can provide a system for managing individual EV charging stations within a EV charging station network. Within this EV charging station network, certain information regarding a given EV charging station can be gathered and updated periodically. Such information regarding the given EV charging station can then be used for routing and/or scheduling charging of EVs through the EV charging stations in the network. FIG. 1 generally illustrates an example of an EV charging station network 100 in accordance with the disclosure. As shown, the EV charging network 100 can include one or more EV charging stations 102, such as 102a-e shown in FIG. 1. As also shown, a given EV charging station 102, such 102a, may be connected to a corresponding power transmission tower 104, such as 104a. The power transmission towers 104a-c may be connected to a same power grid or different power grids and may transmit electric power to the EV charging stations through the power lines.

Information regarding an individual EV charging station 102, such as 102a, can be gathered in the network 100. The information regarding a given EV charging station can include one or more charging modes supported by given charging station 102. For example, the given EV charging station 102a may support a fast mode that may allow an empty battery of an EV to be charged within minutes, a regular mode that may allow the batty to be charged within one hour or so, and a slow mode that may allow the battery to be charged within a few hours. The information regarding the given EV charging station 102 can include availability of the given EV charging station 102. The availability may indicate during which time slots the given EV charging station 102 is available for what mode of charging. For example, the EV charging station 102 may be reserved for two charging sessions for two different EVs and there is a 45 minute window between the two charging sessions. In that example, the information regarding the given EV charge station 102 may indicate that the EV charging station is available to charge an EV in a fast mode for 45 minutes.

The information regarding the individual EV charging station 102 may include information indicating certain type or types of EVs that are supported by the given EV charging station 102. In accordance with various EV standards, there may be different plug types and different charge methods for the EVs. For example, currently there are four different plug types that can be used by EVs. The information regarding the given EV charging station 102 may indicate what types of EVs or plug types that are supported by the given charging station 102.

The information regarding the individual EV charging station 102 may include information indicating a location of the individual EV charging station 102. The location information may include GPS coordinate information, surrounding information (e.g., the EV charging station 102 in located in a shopping mall), road information (e.g., one or more access roads to EV charging station 102), and/or any other information. Such information can be used to determine if the location of the EV charging station 102 is suitable for charging a given EV. For example, if the location information indicating the EV charging station is located in a shopping mall that has business hours between 9 am-9 pm, it may be determined that EV charging station is not suitable for charging an EV overnight in a slow mode.

In some embodiments, for storing and collecting the information described above, the EV charging station 102 may be equipped with necessary hardware. For example, one or more chips may be embedded in a given EV charging station 102, and the chips may be configured to store the location information of the given EV charging station 102, the type of EVs that can be supported by the given EV charging station 102, and/or any other static information regarding the given EV charging station 102. In those embodiments, the chips can be configured to collect dynamic information regarding the given charging station 102, such as the current schedule of the EV charging station, the current load on the EV charging station and/or its power grid and/or any other dynamic information. In some implementations, the individual EV charging stations 102 in the network 102 may be operatively connected to a corresponding monitoring devices, for example a computer located near the EV charging stations 102. In one implementation, it is contemplated that the computer can be operated by a human operator. In that implementation, the human operator can log the dynamic information regarding the EV charging station(s) monitored by the human operator.

The information regarding the individual EV charging stations 102 can be transmitted to one or more of a server 108 over a communications network 106 periodically or non-periodically. The communications network 106 may include a wireless network. For example, the individual EV charging stations 102 in the network 100 may be equipped with wireless communication capability such that they transmit its location information, capacity information, schedule information to the server 108 periodically, for example once every 10 minutes. In some implementation, the communications network 106 may include a backbone network much like the cellular network infrastructure. One skilled in the art will understand different infrastructures of the communications network 106.

Figure 2:
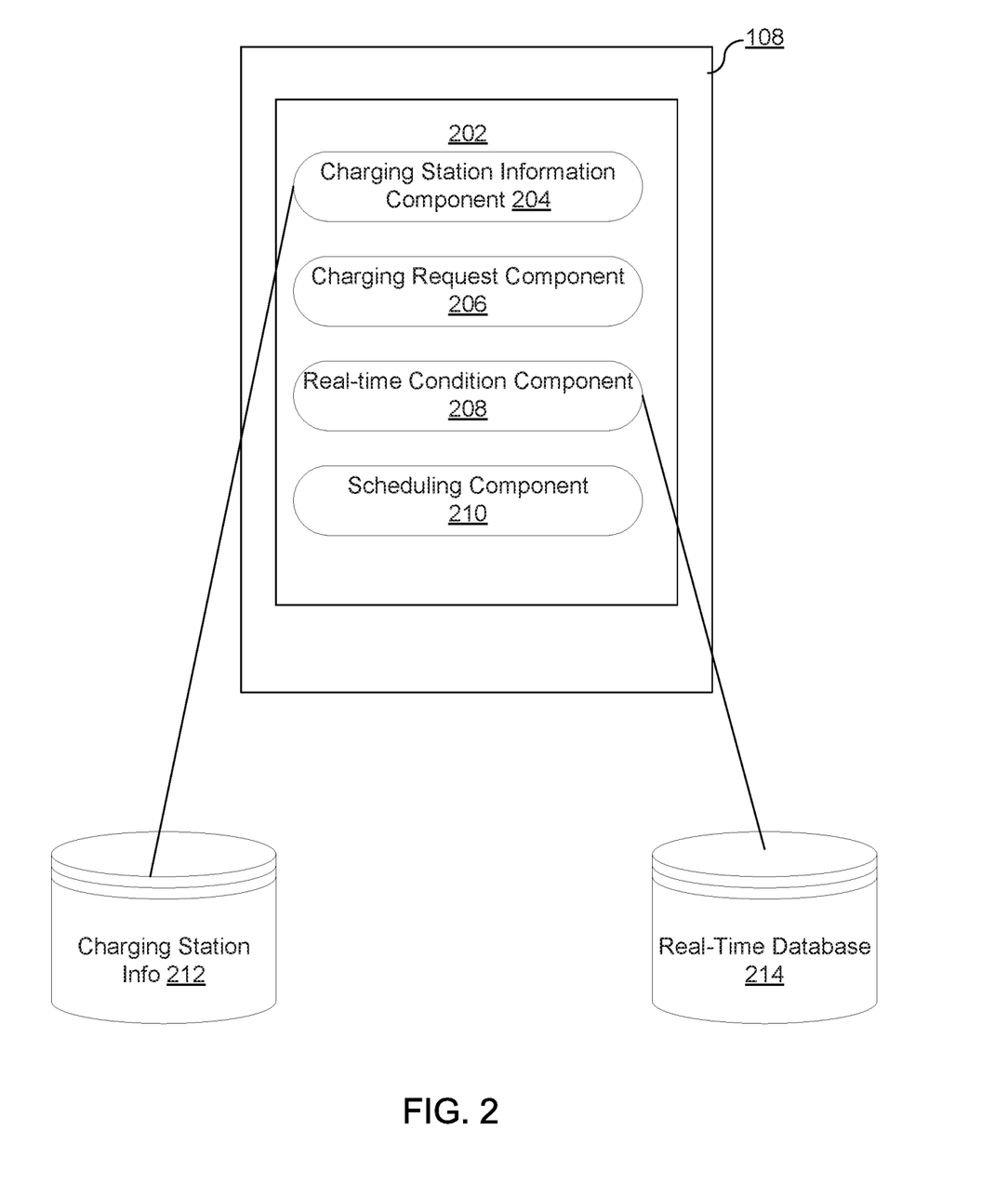
FIG. 2 illustrates one example of a server configured for receiving information regarding EV charging stations in accordance with the disclosure.

The server 108 can be configured to receive the information regarding the EV charging stations 102 and store the received information in a database. FIG. 2 illustrates one example of a server 108 configured for receiving information regarding EV charging stations in accordance with the disclosure. It will be described with reference to FIG. 1. As shown, the server 108 may include one or more of a processor 202 configured to execute program components, which may include a charging station information component 204, a charging request component 206, a real-time condition component 208, a scheduling component 210, and/or any other components. The charging station information component 204 can be configured to receive information regarding the individual EV charging stations as described above and herein. In implementations, the charging station information component 204 can be configured to communicate with individual EV charging stations 102 in the network 100 and/or one or more computers monitoring the individual EV charging stations 102. Periodically or non-periodically, the charging station information component 204 can receive information regarding a given EV charging station through the communications network 106. In implementations, the server 108 can be operatively connected to one or more of a database 212 configured to store information regarding the individual EV charging stations in the network 100. As shown, as the charging station information component 204 receives the information regarding the individual charging station 102, it can be configured to store or update with the received information in the database 212 for user by other components of server 108, such as scheduling component 210.

Figure 3:
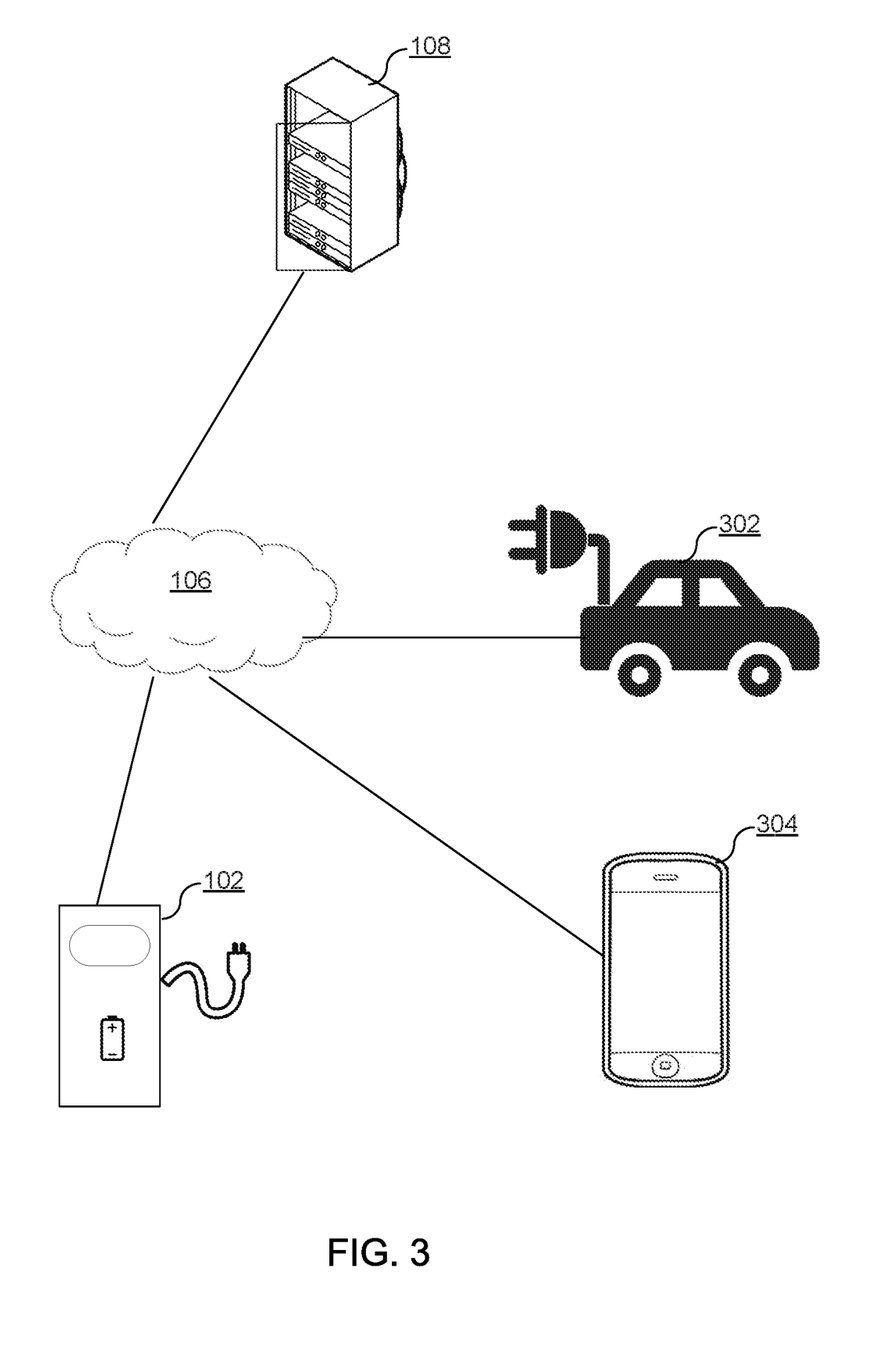
FIG. 3 illustrates generally a charging request can be received by the server shown in FIG. 2.

The charging request component 206 can be configured to receive a charging request for a charging session through a EV charging station 102 in the network 100. FIG. 3 illustrates generally a charging request can be received by the server 108 via charging request component 206. As shown, in some embodiments, the EV 302 may be equipped one or more processors that can request a charging session for EV 302. For example, the EV 302 can be equipped with vehicle control unit (VCU) configured to determine whether the EV 302 needs to be charged. For instance, the VCU can be configured to acquire information regarding a current level of battery power remaining in the battery or batteries of the EV 302 and information regarding a destination or destinations the EV 302 is or will be traveling to. Based on such information, the VCU can determine whether there is enough battery power for EV 302 to travel to the destination(s) and generate a request for charging the EV 302 when it determines there is not enough battery power. The request generated by the VCU in those implementations can include information indicating a current location of the EV 302, a destination the EV 302 is or will be traveling to, a speed of the EV 302 is currently traveling at, a plug type required by EV 302 for charging, the remaining battery power, one or more charging modes supported by EV 302, and/or any other aspects.

As shown, it should be understood the request received by the charging request component 206 may not necessarily be initiated from a EV 302. In some embodiments, the request can be initiated by a computing device associated with the EV 302. For example, a user of EV 302 can be enabled to use his/her smart phone, such as the smart phone 304 shown in FIG. 3 to initiate a request to charge the EV 302. In those embodiments, request generated by the smart phone 304 can include the EV information described above, a requested time to begin the charging and as well as location information of the EV 302. For example, the user may be traveling in EV 302 with the smart phone 304, and therefore the location of the smart phone 304 is the location of EV 302. In that example, the location of the smart phone 302 can be transmitted to server 108 as the location of the EV. A user, a driver of the EV 302 may be enabled to initiate a request to charge the EV 302 through the smart phone 304. The request may include information indicating a current location of the EV 302, and a requested time for charging the EV 302.

As also shown in FIG. 3, the request for charging EV 302 can be transmitted to the server 108 through the communications network 106. In some implementations, the request may be first transmitted from the EV 302 or the client computing device 304 wirelessly to a relay station, which can then transmit the request to the server 108 through a wired network. After the server 108 receives the request via the charging request component 206, it may process the request and to facilitate the requested charging for the EV 302.

The real-time condition component 208 can be configured to obtain real-time conditions for scheduling a charging session for the EV 302 after the request has been received by the charging request component 206. In various implementations, the server 108 may be operatively connected to a real-time database 214 and the real-time condition component 208 can be configured to obtain real-time condition information from the real-time database 214 as shown. The real-time condition information may include traffic information regarding areas where the EV charging stations 102 are located, current capacity information regarding the facilities where the EV charging stations 102 are located, current weather condition information regarding the areas where the EV charging stations 102 are located, and/or any other real-time condition information. As illustration, the real-time condition information can include real-time traffic information indicating traffic flow within an area where a given EV charging station 102 is located. Such traffic information can be used to determine an amount of time it may take for the requesting EV 302 to travel to. The current capacity information regarding a facility where the given EV charging station 102 is located may indicate a crowd situation of the facility. For example, the given EV charging station 102 may be located in a shopping mall, and the capacity information may indicate that the shopping mall is crowded such that it may take extra time for the requesting EV 302 to get to the given EV charging station 102 after entering the shopping mall.

In some implementations, the real-time condition information obtained by the real-time condition component 208 may include information indicating a current overall load on the power grid the individual EV charging station 102 is on. For example, such information may indicate that the power grid is 75% at its capacity, 100 at its capacity, or over its capacity. Such information can be used to determine if the individual EV can be used for charging individual EVs and not to over-burden the power grid.

The scheduling component 210 may be configured to select one or more EV charging stations 102 that are available to charge the requesting EV 302 in response to a request is received by the charging request component 206. As described, the request may include location information indicating a current location of the requesting EV 302 and one or more destinations the requesting EV 302 is traveling to. In some implementations, the scheduling component 210 can be configured to determine one or more paths or routes the requesting EV 302 can travel to the one or more destinations from the current location of the EV 302 as indicated by the location information included in the request. In those implementations, based on the determined one or more paths or routes, the scheduling component 210 can be configured to determine a set of one or more EV charging stations 102 that can be used to charge the EV 302. After determining the set of one or more EV charging stations 102, the scheduling component 210 can be configured to obtain information regarding each charging station 102 in the set. As described above and herein, the information regarding the charging station 102 can indicate one or more time windows available for charging the EV 302, whether the charging station 102 supports the charging of the EV 302 (e.g., whether the charging station supports the plug type of the EV 302), one or more modes available for charging the EV 302. Such information can be used by the scheduling component 210 to determine whether a given charging station 102 in the set can be "pushed" to the EV 302 or the smart phone 304 that initiated the request.

In some implementations, after the scheduling component 210 determines the one or more charging stations 102 are on the path of the EV 302 to the destinations, the scheduling component 210 can obtain real-time condition information regarding the area and/or facility where each of the determined one or more EV charging stations 102 is located. For example, the real-condition information may indicate a level of traffic in the area or the facility (e.g., a shopping mall), the weather condition in the area or the facility, and/or any other information. The real-condition information may indicate a type of road or roads that can access the EV charging station. As mentioned above, the real-condition information may indicate a capacity of the power grid on which the EV charging station 102 is located. For example, the real-time condition information can indicate the power grid is at 100% of its capacity. Based on such real-time condition information and/or the information regarding the charging stations 102, the scheduling component 210 can be configured to select one or more charging stations 102 in the set for pushing to the EV 302 and/or the smart phone 304 that initiated the request to charge the EV 302.

In some implementations, the scheduling component 210 can be configured to receive a response indicating a selection of a charging station 102 from the EV 302 or the smart phone 304. In those implementations, the response may also include a selection of time, a mode of charging and/or any other aspects for charging the EV 302. For example, as illustration, the response may indicate that the EV 302 would like to schedule a charging session at charging station 102a at 3 pm this afternoon for a fast mode charging. In those implementations, after receiving the response, the scheduling component 210 can be configured to send a reservation instruction to the selected EV charging station 102, e.g., the EV charging station 102a, to reserve the EV charging station 102 for charging the EV 302 as requested. Once a response is received from the selected EV charging station 102 that the reservation is successful, the scheduling component 210 can update the information regarding the selected EV charging station 102 to indicate that the selected EV charging station 102 is not available at the selected time for a duration of an amount of time required for charging the EV 302 in the selected mode.

Figure 4:
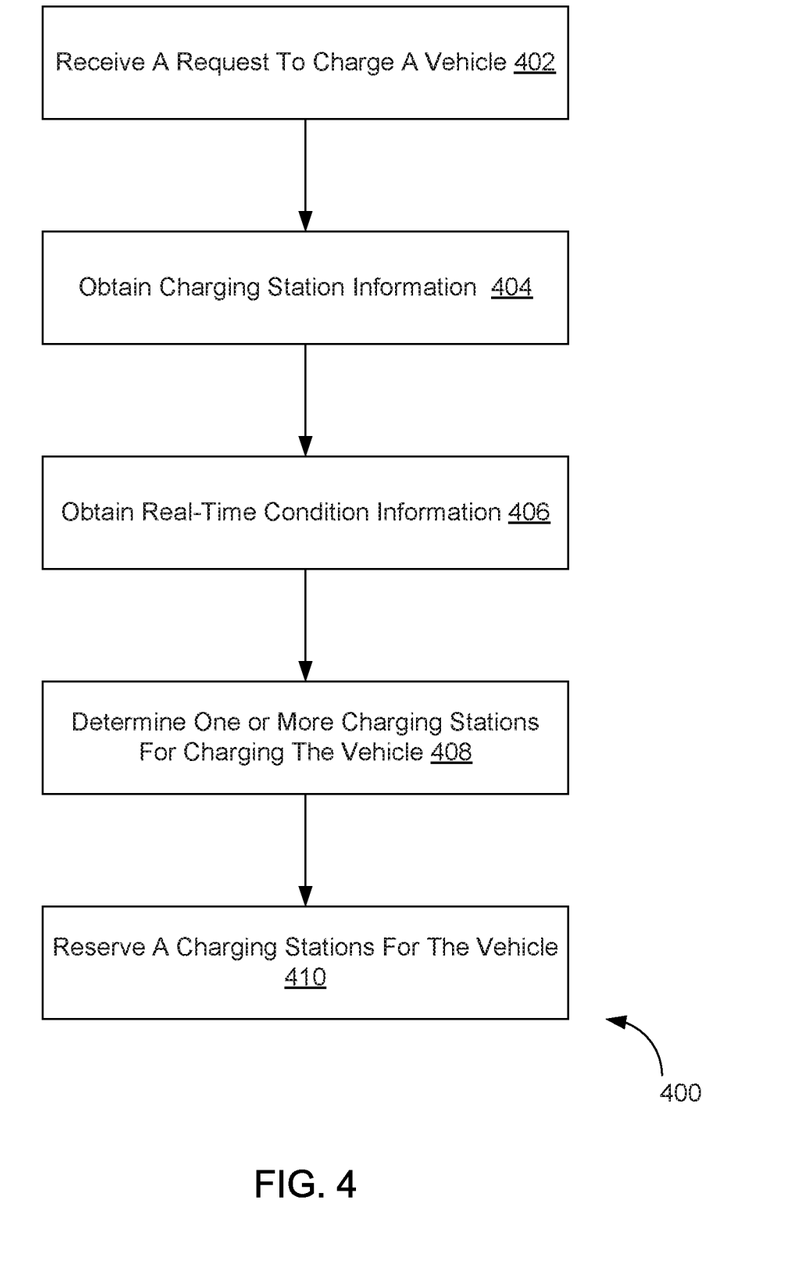
FIG. 4 illustrates an exemplary method for scheduling a charging session with a EV charging station for a EV shown in FIG. 1.

Attention is now is directed to FIG. 4 which illustrates an exemplary method 400 for scheduling a charging session with a EV charging station for a EV shown in FIG. 1. The particular series of processing steps depicted in FIG. 4 is not intended to be limiting. It is appreciated that the processing steps may be performed in an order different from that depicted in FIG. 4 and that not all the steps depicted in FIG. 4 need be performed. In certain implementations, the method 400 may be implemented by a computer system, such as the computer system shown in FIG. 5.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, a request to charge an EV can be received. The request received at 402 can include information indicating a current location of the EV, a destination the EV is or will be traveling to, a speed of the EV is currently traveling at, a plug type required by EV for charging, the remaining battery power, one or more charging modes supported by EV, and/or any other aspects. The request can be received through a communications network, such as the communications network 106 described and illustrated herein. In some implementations, the request may be first transmitted from the EV or a client computing device associated with the EV wirelessly to a relay station, which can then transmit the request through a wired network. In some implementations, operations involved in 402 can be implemented by a charging request component the same as or substantially similar to charging request component 206 described and illustrated herein.

At 404, information regarding one or more charging stations that can facilitate the request received at 402 may be obtained. The information regarding a given EV charging station can include information indicating one or more charging modes supported by a given charging station, a location of the given charging station, an availability of the given charging station, information indicating certain type or types of EVs that are supported by the given EV charging station, and/or any other aspects. In some implementations, operations involved in 404 can be implemented by a charging station information component the same as or substantially similar to charging station information component 204 described and illustrated herein.

At 406, real-time condition information can be obtained. The real-time condition information may include traffic information regarding areas where the EV charging stations are located, current capacity information regarding the facilities where the EV charging stations are located, current weather condition information regarding the areas where the EV charging stations are located, and/or any other real-time condition information. As illustration, the real-time condition information can include real-time traffic information indicating traffic flow within an area where a given EV charging station is located. Such traffic information can be used to determine an amount of time it may take for the requesting EV to travel to. In some implementations, the real-time condition information obtained at 406 may include information indicating a current overall load on the power grid the individual EV charging station is on. In some implementations, operations involved in 406 can be implemented by a real-time condition component the same as or substantially similar to real-time condition component 208 described and illustrated herein.

At 408, one or more charging stations that are available to charge the requesting EV can be determined in response to a request is received at 402. In some implementations, the determination at 408 can involve determining one or more paths or routes the requesting EV may travel to the one or more destinations from the current location of the EV 302 as indicated by the location information included in the request received at 402. The determination at 408 can be based on the changing station information obtained at 404 and/or the real-time condition information obtained at 406. The information regarding the charging station can indicate one or more time windows available for charging the EV, whether the charging station supports the charging of the EV (e.g., whether the charging station supports the plug type of the EV), one or more modes available for charging the EV. The real-condition information may indicate a level of traffic in the area or the facility (e.g., a shopping mall), the weather condition in the area or the facility, and/or any other information. In some implementations, the real-condition information may indicate a capacity of the power grid on which the EV charging station is located. In some implementations, operations involved in 408 can be implemented by a scheduling component the same as or substantially similar to a scheduling component 210 described and illustrated herein.

At 410, a charging station from the one or more charging stations determined at 408 can be reserved for the requesting EV. In some implementations, operations involved in 408 can be implemented by a scheduling component the same as or substantially similar to a scheduling component 210 described and illustrated in FIG. 1.

Figure 5:
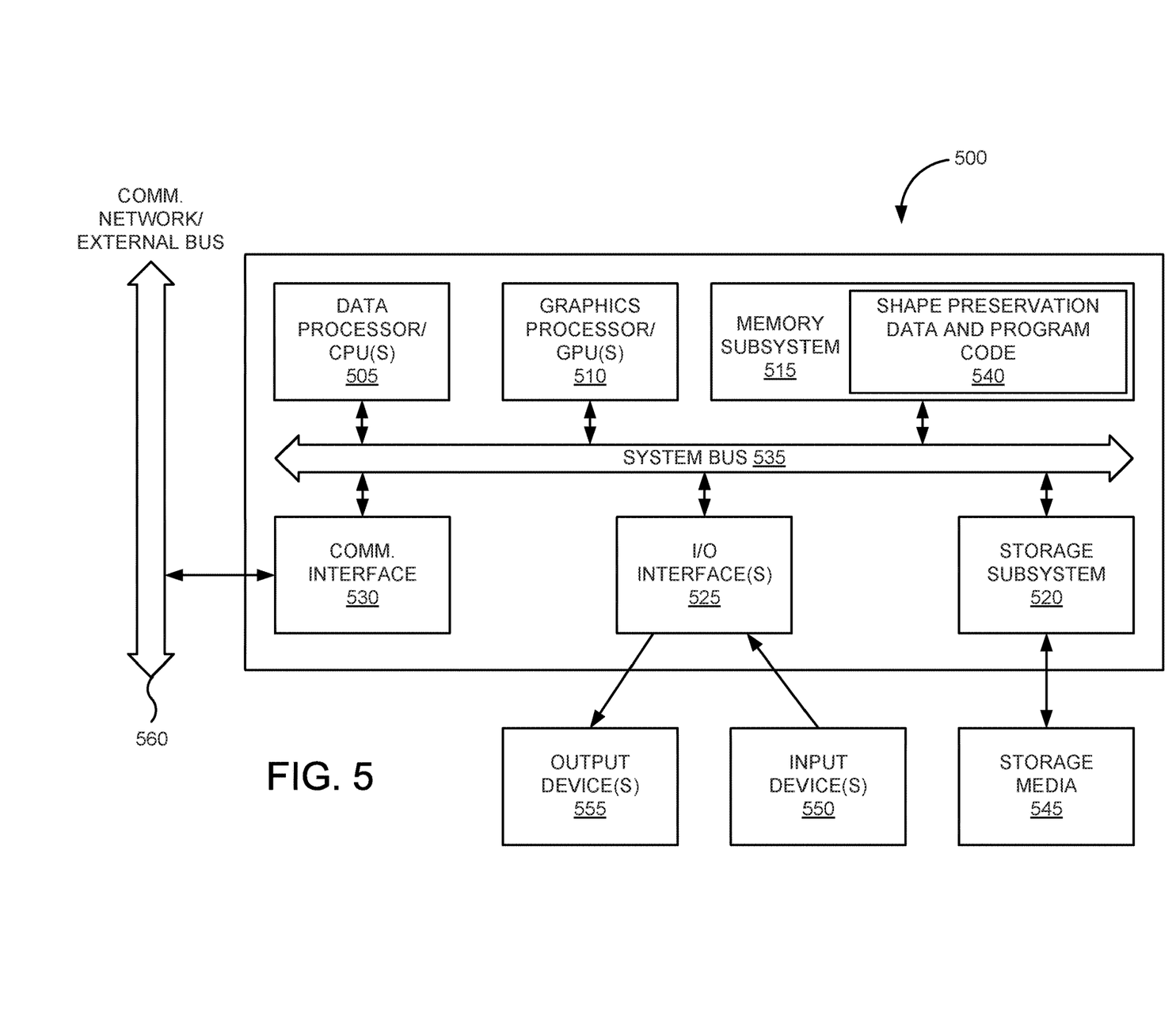
FIG. 5 illustrates one example of a computer system that can be used to implement various embodiments described and illustrated herein.

FIG. 5 illustrates a simplified computer system that can be used implement various embodiments described and illustrated herein. A computer system 500 as illustrated in FIG. 5 may be incorporated into devices such as a portable electronic device, mobile phone, or other device as described herein. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, and/or the like; and one or more output devices 520, which can include without limitation a display device, a printer, and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, an 502.11 device, a WiFi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, e.g. the first electronic device, may be incorporated into the computer system 500, e.g., an electronic device as an input device 515. In some embodiments, the computer system 500 will further comprise a working memory 535, which can include a RAM or ROM device, as described above.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system for reserving a charging station for charging an electric vehicle, the system comprising one or more of a processor configured to execute machine-readable instructions such that when the machine-readable instructions are executed to cause the one or more processors to perform:

periodically, receiving, from charging stations, charging station information regarding the charging stations, wherein the charging station information includes availability information indicating availability of the charging stations and location information of the charging stations, wherein the availability information indicates time slots in which the charging stations are available to charge electric vehicles, wherein the location information of the charging stations includes GPS coordinate information, surrounding information, business hours information and road information;

periodically, storing the received charging station information;

receiving a current battery level of the electric vehicle and a destination the electric vehicle travels to;

determining whether battery power of the electric vehicle is enough to travel to the destination;

in determination that the battery power for the electric vehicle is not enough to travel to the destination, generating a charging request for charging the electric vehicle;

receiving the charging request for charging the electric vehicle, wherein the request indicates at least one of following parameters: a current location of the electric vehicle, a plug type of the electric vehicle, the current battery level of the electric vehicle, a current speed of the electric vehicle, the destination the electric vehicle travels to, a charging mode for charging the electric vehicle, and a time point at which the electric vehicle can be charged;

wherein the charging mode is a fast mode, a regular mode or a slow mode;

obtaining charging station information regarding charging stations based on the current location of the electric vehicle in response to the charging request being received;

obtaining real-time condition information based on the charging station information obtained in response to the charging request being received, wherein the real-time condition information comprises facility capacity information indicating a capacity of a facility where each charging station is located in, and power grid capacity information indicating a capacity level of a power grids the charging stations are located on;

determining one or more of the charging stations available for charging the electric vehicle based on the charging station information, the charging request and the real-time condition information, wherein the determination comprises determining whether power grids where the one or more of the charging stations are located on are over a predetermined capacity level, and the one or more of the charging stations are determined as being available for charging the electric vehicle only when the power grids are not over the predetermined capacity level;

transmitting information regarding the determined one or more charging stations to the electric vehicle;

receiving a response from the electric vehicle, the response indicating a selection of a charging station from the determined one or more charging station; and generating a reservation instruction for reserving the selected charging station.

2. The system of claim 1, wherein the real-time condition information further indicates a real-time traffic level of areas where the charging stations are located in; and, wherein the determination of the one or more charging stations is further based on the real-time condition information.

3. The system of claim 2, wherein the real-time condition information further includes information indicating a weather condition of the areas.

4. The system of claim 1, wherein the charging station information includes information regarding a first charging station that comprises information indicating a location of, one or more charging modes supported by and/or one or more available time windows for charging by the first charging station.

5. The system of claim 1, wherein determining the one or more of the charging stations for charging the electric vehicle based on the charging station information comprises determining a path on which the electric vehicle can travel to a destination; and, wherein the determination of the one or more charging stations is based on the path.

6. The system of claim 1, wherein the response further includes information indicating a time point and/or a selected charging mode for charging the electric vehicle.

7. The system of claim 1, wherein the one or more processors are further caused to perform transmitting the reservation instruction to the selected charging station for executing the reservation instruction.

8. The system of claim 1, wherein the one or more processors are further caused to perform receiving a confirmation message confirming the selected charging station has been successfully reserved for the electric vehicle.

9. A method for reserving a charging station for charging an electric vehicle, the method being implemented by one or more of a processor configured to execute machine-readable instructions, the method comprising:

periodically, receiving, from charging stations, charging station information regarding the charging stations, wherein the charging station information includes availability information indicating availability of the charging stations and location information of the charging stations, wherein the availability information indicates time slots in which the charging stations are available to charge electric vehicles, wherein the location information of the charging stations includes GPS coordinate information, surrounding information, business hours information and road information;

periodically, storing the received charging station information;

receiving a current battery level of the electric vehicle and a destination the electric vehicle travels to;

determining whether battery power of the electric vehicle is enough to travel to the destination;

in determination that the battery power for the electric vehicle is not enough to travel to the destination, generating a charging request for charging the electric vehicle;

receiving the charging request for charging the electric vehicle, wherein the request indicates at least one of following parameters: a current location of the electric vehicle, a plug type of the electric vehicle, the current battery level of the electric vehicle, a current speed of the electric vehicle, the destination the electric vehicle travels to, a charging mode for charging the electric vehicle, and a time point at which the electric vehicle can be charged; wherein the charging mode is a fast mode, a regular mode or a slow mode;

obtaining charging station information regarding charging stations based on the current location of the electric vehicle in response to the charging request being received;

obtaining real-time condition information based on the charging station information obtained in response to the charging request being received, wherein the real-time condition information comprises facility capacity information indicating a capacity of a facility where each charging station is located in, and power grid capacity information indicating a capacity level of a power grids the charging stations are located on;

determining one or more of the charging stations available for charging the electric vehicle based on the charging station information, the charging request and the real-time condition information, wherein the determination comprises determining whether power grids where the one or more of the charging stations are located on are over a predetermined capacity level, and the one or more of the charging stations are determined as being available for charging the electric vehicle only when the power grids are not over the predetermined capacity level;

transmitting information regarding the determined one or more charging stations to the electric vehicle and the real-time condition information;

receiving a response from the electric vehicle, the response indicating a selection of a charging station from the determined one or more charging station; and generating a reservation instruction for reserving the selected charging station.

10. The method of claim 9, wherein the real-time condition information further indicates a real-time traffic level of areas where the charging stations are located in; and, wherein the determination of the one or more charging stations is further based on the real-time condition information.

11. The method of claim 10, wherein the real-time condition information further includes information indicating a weather condition of the areas.

12. The method of claim 9, wherein the charging station information includes information regarding a first charging station that comprises information indicating a location of, one or more charging modes supported by and/or one or more available time windows for charging by the first charging station.

13. The method of claim 9, wherein determining the one or more of the charging stations for charging the electric vehicle based on the charging station information comprises determining a path on which the electric vehicle can travel to a destination; and, wherein the determination of the one or more charging stations is based on the path.

14. The method of claim 9, wherein the response further includes information indicating a time point and/or a selected charging mode for charging the electric vehicle.

15. The method of claim 9, further comprising transmitting the reservation instruction to the selected charging station for executing the reservation instruction.

16. The method of claim 9, wherein the one or more processors are further caused to perform receiving a confirmation message confirming the selected charging station has been successfully reserved for the electric vehicle.

* * * * *